Nov. 2, 1926.
A. HUETTER
1,605,235
EXPANSIBLE CORE
Filed Sept. 17, 1923      2 Sheets-Sheet 1
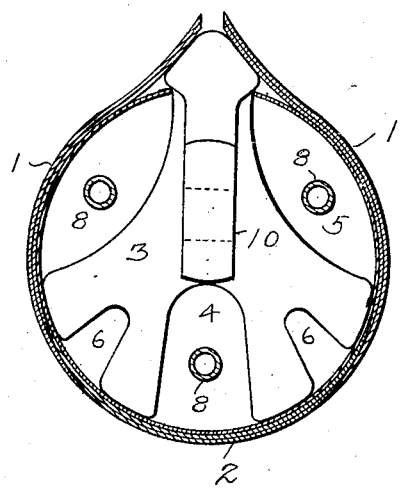
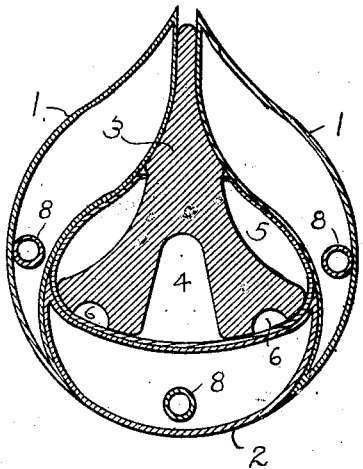
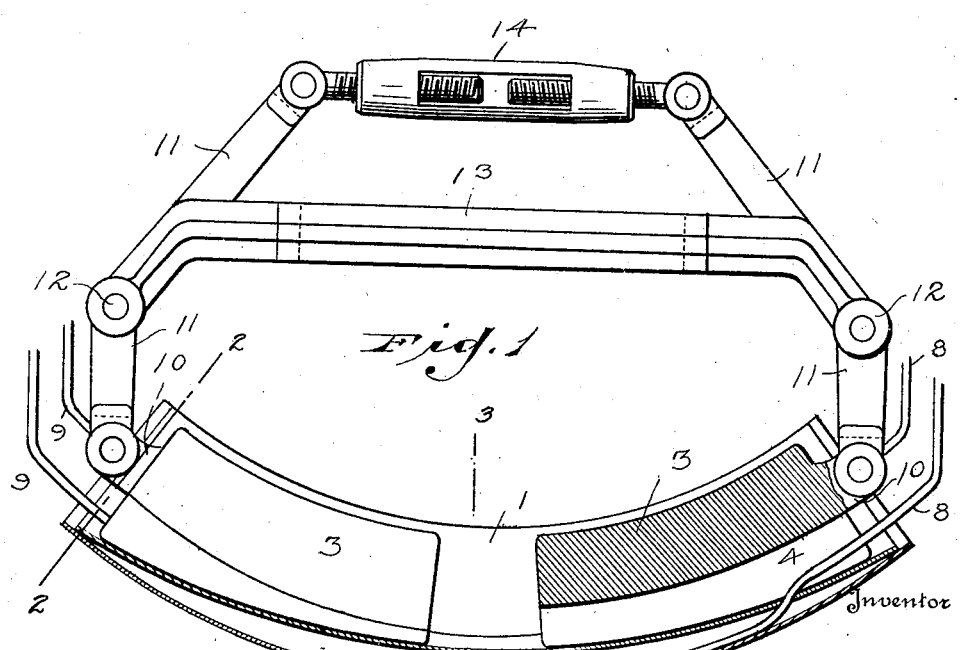

Nov. 2, 1926.  A. HUETTER  1,605,235
EXPANSIBLE CORE
Filed Sept. 17, 1923   2 Sheets-Sheet 2
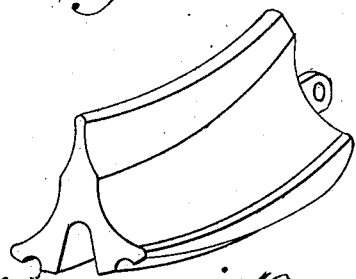
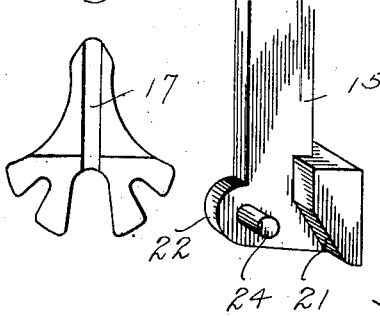
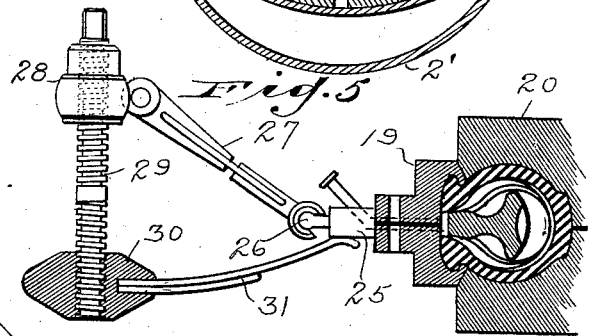
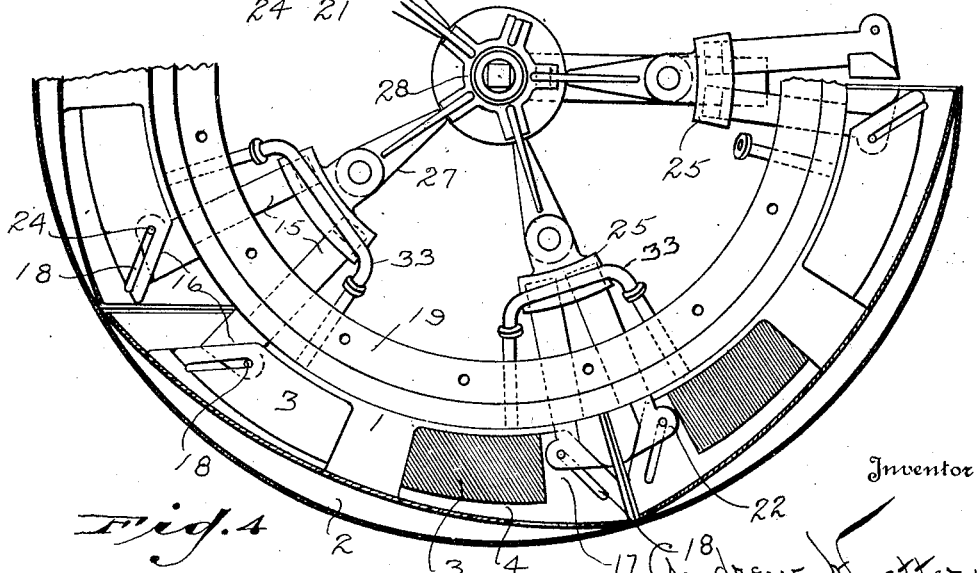
Inventor
Andrew Huetter
By J. L. Walker, Attorney Patented Nov. 2, 1926.

1,605,235

UNITED STATES PATENT OFFICE.

ANDREW HUETTER, OF DAYTON, OHIO, ASSIGNOR TO THE ARTYR COMPANY, OF DAYTON, OHIO, A CORPORATION OF OHIO.

EXPANSIBLE CORE.

Application filed September 17, 1923. Serial No. 663,203.

My invention relates to molds for plastic material, and more particularly to an expansible core for use in the manufacture and repair of pneumatic tires for vehicles and like articles.

The invention contemplates an expansible arcuate core body, subject to either or both internal fluid pressure and mechanical pressure by which the cross sectional contour of the core may be expanded. The core consists of several relatively movable sections, comprising ogee side sections and a convex tread section, the exterior surfaces of which are contoured to agree with the interior face of a tire casing, the faces of the several sections merging easily one into the other, whereby a substantially uniform or continuous unbroken exterior surface will be maintained throughout the range of relative adjustment of the respective sections. The interior faces of the relatively movable side and tread sections are tapered or inclined to afford cam faces, engaged by longitudinally movable plungers, by which the sections are wedged apart or relatively adjusted to expand the core while within a tire casing. The sections are preferably though not necessarily formed hollow for the circulation of live steam therethrough whereby the casing is subjected to internal heat as well as pressure. While the walls of the relatively adjustable core sections if hollow, may be entirely rigid, they are preferably formed of flexible but inextensible material, whereby the sections may be flexed or somewhat distorted by internal fluid pressure to augment and equalize the pressure afforded by the adjustment of the plunger. Such core unit comprising the assembly of relatively adjustable sections may be employed singly for tire repair purposes, or when connected in multiple to form an annular succession they may be employed as a mandrel or core, upon which to initially build a new tire casing, which is subsequently subjected to internal pressure by the expansion of such core or mandrel.

The invention is intended to obviate the use of expansible air bags of fabric or rubber, which deteriorate rapidly under the influence of repeated vulcanizing operation, and to further avoid the necessity of transferring a tire casing previous to vulcanization from the building form or core to such expansible air bags, during which transfer the uncured tire casing is frequently injured or distorted.

The object of the invention is to simplify the structure as well as the means and mode of operation of expansible tire cores or mandrels, whereby they will not only be cheapened in construction, but will be more efficient in use, positive in operation, uniform in action, of greater durability, and unlikely to get out of repair.

A further object of the invention is to provide an improved form of expanding mandrel or core, wherein the internal pressure will be equalized upon the side and tread of the casing, and furthermore, which will subject the bead or margins of the casing to similar expanding pressure.

A further object of the invention is to provide an expanding core employing mechanical pressure, and to provide in conjunction therewith, means for supplying internal heat for vulcanizing purposes by the circulation of live steam, or the like.

A further object of the invention is to provide in a mechanically operated expanding core, fluid pressure means for equalizing the pressures, and augmenting the mechanical pressure.

A further object of the invention is to provide a multiple section core unit, with means for relatively adjusting such core sections while maintaining a uniform unbroken exterior surface.

With the above primary and other incidental objects in view as will more fully appear in the specification, the invention consists of the features of construction, the parts and combinations thereof, and the mode of operation or their equivalents as hereinafter described and set forth in the claims.

In the accompanying drawings, Fig. 1 is a sectional view of one of the multiple sections or core units, embodying the subject matter hereof, to which is connected adjusting means, by which the unit may be employed for tire repair purposes. Fig. 2 is an end elevation of the assembled core unit on lines 2—2 of Fig. 1. Fig. 3 is a transverse sectional view on line 3—3 of Fig. 1. Fig. 4 is a plan view partly in section of a segmental portion of an annular assembly of such core units by which the core is adapted to tire manufacturing purposes. Fig. 5 is a detail view of the adjustable means for the multiple core assembly, illustrated in Fig. 4, showing in section one side of a mold or matrix with a tire casing, and the adjustable core enclosed therein. Fig. 6 is a detail perspective view of one of the plunger adjusting cam wedges employed in the assembly. Fig. 7 is an end elevation of one of the adjusting plungers, adapted for the engagement of the cam wedge. Fig. 8 is a transverse sectional view of a modification of the core, wherein the tread section extends exteriorly of the side sections, contrary to the arrangement shown in Figs. 2 and 3. Fig. 9 is a detail perspective view of one of the cam wedges.

Like parts are indicated by similar characters of reference throughout the several views.

The arcuate mandrel or core forming the subject matter hereof may be employed singly for the purpose of repairing tire casings, or a series of such cores may be jointed end to end to form an annular succession or complete ring core for tire manufacturing purposes. In the latter event, one of the mandrels or cores, is necessarily provided with parallel ends to form a key section, removable inwardly to enable the removal of the core or mandrel unit after the completion of the tire casing. Such assembly of separable arcuate mandrels or core units is illustrated in Fig. 4.

The expansible core or mandrel forming the subject matter hereof comprises a pair of longitudinally disposed relatively movable side members, 1—1 of reverse curve or ogee form in cross section, and an intermediate tread section 2 of convex cross sectional shape, the lateral sides of which are overlapped by the concave margins of the adjacent side sections 1. The overlapping marginal edges of the side section 1, are reduced to substantially feather edges to enable the external faces of the side sections, to merge easily onto the convex exterior contour of the medial tread section 2 in different positions of relative adjustment. The relatively adjustable sections 1 and 2 are comparatively thick at their medial portions, as shown in the transverse sectional view Fig. 3, and also in Fig. 1, and converge or taper toward their extremity. The sections 1 and 2 are preferably though not necessarily of hollow construction to enable the circulation of live steam or other medium therethrough. They are preferably constructed of flexible but inextensible sheet material, having heat resistant properties such as sheet metal, frictional canvas, rubberized canvas, fiber, composition, hard rubber or other materials having the necessary characteristics. See Patents Nos. 1,368,631 and 1,439,895. This enables the walls of such hollow members to yield or expand to compensate for irregularities in the tire casing, and to equalize the pressure. Such flexible walled sections are capable of a limited degree of distortion under the influence of internal fluid pressure by which the mechanical pressure is augmented. However, such sections may be of hollow construction, but with rigid inflexible walls enabling their use as heating elements for the circulation of live steam without the additional function of equalizing or increasing the pressure under the influence of such internal fluid pressure. In those instances, wherein internal vulcanizing heat is unnecessary or undesirable and the flexibility and equalization of pressure unnecessary, the units may be solid throughout. These elements 1 and 2 are assembled about a pair of oppositely disposed longitudinally adjustable tapered plungers 3, which substantially agree with the interior contour of the respective sections. These plungers 3 may be made to fit accurately throughout the full area of the inner faces of the respective members, 1 and 2 but for economy of material, and to minimize the weight of the plungers and of the units as a whole, these plungers 3 are preferably recessed or relieved by means of reentrant arcuate faces or grooves 4, 5 and 6, extending longitudinally of the plunger. These reentrant grooves or recesses vary in depth throughout the length of the plunger, being deepest at the outer or large extremity of the plungers, and much more shallow at their inner ends. These reentrant grooves or recesses are of such extent as to leave intact ample bearing faces for engagement with respective core sections. Fig. 2 of the drawing shows the inner and outer walls of the hollow core sections contacting or merging one into the other at the extremity of the unit. To the contrary Fig. 3 shows these sections with their walls widely separated on a medial plane. The relative cross sectional area of the plunger, as shown in Figs. 2 and 3, indicates the degree of taper or capacity of the plunger for wedging effect. The plunger bears laterally upon the side sections 1—1, particularly adjacent to their inner margins, thereby tending to separate or spread such side sections, to subject the bead portion of the tire casing to internal pressure. At the same time the outer or convex face of the plunger bears outwardly or in a radial direction in relation with the arcuate unit upon the inner face of the tread section 2. The arcuate or inturned overlapping marginal edges of the side sections 1—1, afford thereon a cam like bearing like surface of the medial section 2, which under influence of the outward or radial pressure of the plunger tends to exert such camming influence to spread such overlapping margins of the side sections. It will be understood that in any event such spreading action is through a comparatively small range of adjustment. Within such range the relative movement of the sections will not appreciably distort the regularity of the cross sectional contour of the core, but will serve to enlarge such contour, by increasing both its width and depth.

Inasmuch as the sections 1 and 2, converge toward their opposite ends, two of the plungers or pressure members 3 are employed, operating to and from each other from opposite ends of the core. The reentrant recesses or grooves 4 and 5 are utilized for the entrance of steam supply and exhaust conduits 8 and 9, which extending through such recesses intersect the inner walls of the adjustable sections 1 and 2. Any suitable means may be employed for adjusting or reciprocating the plunger 3, within the assembly of core sections 1 and 2. In Fig. 1 there is shown a very simple operating mechanism which enables the adjustable core to be employed with any of the standard vulcanizing molds now employed for tire repair purposes. For such repair purposes, it is customary to use only a short segmental mold and a single core unit. In this construction, each plunger 3 is provided with a terminal lug or ear 10, with which is engaged an operating lever 11, fulcrumed at 12, to the end of an intermediate strut bar or space bar 13. The levers 11 pivoted at each end of this bar are connected to the respective plungers 3, and are interconnected at their opposite ends by any suitable adjusting device, in this instance shown as a simple form of turn-buckle. By adjusting the turn-buckle 14, to force the connected ends of the levers 11 outwardly and apart, the plungers 3 are uniformly forced within the assembly of core sections to affect uniform expansion thereof. At the same time live steam is circulated through the hollow sections by means of inlet and exhaust conduits 8 and 9, to heat such core sections and subject the tire casings to internal vulcanizing temperature. The plungers 3 are shaped to affect uniform expansion of the core. However, it sometimes happens that the carcass of a casing is of uniform thickness, or due to other irregularities of manufacture, some portions of the tire carcass may be more yielding than others, and by the uniform adjustment of the plungers, the core will not be caused to bear uniformly due to such unevenness or irregularity of the tire structure. In the event that the walls of the core sections are of flexible material, the admission of steam, air, water or other fluid under pressure within such hollow sections will expand or distort such sections at the point of unequal or minimum pressure, thereby equalizing the pressure upon the entire interior of the tire. It is understood that the core when in contracted form is made to approximately fit the tire casing. Sufficient clearance is permitted to enable its easy insertion and removal from the casing. Consequently it does not require a great degree of mechanical adjustment of the tire section by reciprocation of the plungers in order to bring the sections into firm engagement or a heavy pressure by such mechanical means. This pressure is then augmented by the admission of the fluid under pressure to the interior of the sections, whereby the pressure is equalized and any low point or relaxed areas unaffected by the mechanical pressure due to such iregularities are subjected to pressure by the distortion or expansion of the flexible sections. While the lever operating means shown in Fig. 1 is quite satisfactory when applied to a single core unit for repair purposes, it is obvious that it is not adapted to the assembly of such unit into an annular series. To enable the core units to be assembled end to end in close relation, there is shown in Fig. 4 a different form of plunger adjustment, which, however, is also applicable to single units. In this construction, each plunger 3 is operated by a radially movable cam wedge 15, which projects between the inner marginal edges of the side sections 1—1, adjacent to the ends of the unit and has operative engagement with the adjacent end of the plunger 3. The plunger 3 in this instance is provided with a beveled extremity 16, affording a cam face, in which is located a terminal slot 17. Extending transversely through the plunger and intersecting such terminal slot 17 is a second slot 18, extending parallel with the cam face 16. The reciprocatory cam wedges 15, have sliding bearings adjacent to their outer ends in the bead rings 19 of the matrix or mold 20. At their inner ends these cam bars or wedges 15 are provided with laterally disposed inclined or cam shoulders 21, having operative engagement with the beveled faces 16 of the plungers 3. Intermediate such lateral shoulders 21 there is provided upon each cam bar a tongue 22, extending within the terminal slot 17 of the plunger, and transfixed by a pin or stud 24 having sliding engagement in the inclined lateral slot 18.

The construction is such that the reciprocatory movement of the cam bar or wedge 15 in an outward radial direction in relation with the arcuate core, causes the lateral cam shoulders 22 to bear upon the cam face 16 of the adjustment plunger 3 to move such plunger longitudinally within the assembly of core sections thereby expanding the core unit. During this movement the transverse pin 24 follows outward through the slot 18, as the cam bar and plunger are relatively adjusted. Upon the retractive movement of the cam bar or wedge 15 to withdraw the plunger 3 and permit the contraction of the core unit, the transverse pin 24 operating within the inclined cam slot 18 effects a corresponding retraction of the plunger. Any suitable means may be provided for reciprocating the cam bar 15. A simple, but by no means the only available mode of operation is indicated in Figs. 4 and 5, wherein a form of toggle press is employed. In this construction each pair of cam bars pertaining to the adjacent ends of the succeeding core units, are provided with a common bearing head 25, having thereon a ball stem 26. This stem is engaged by one end of a toggle arm 27, having therein a socket forming with such ball stem a simple ball and socket joint. The opposite end of the toggle arm 27 is pivoted to an adjusting nut 28, threaded upon a screw stem 29. In this instance the screw stem 29 is shown with both right and left threads. One thread engages the nut 28, while the second thread engages the second nut 30, having spring arms 31, bearing upon the adjusting head 25. The socket connection at the ends of the arms 27 preferably open laterally to permit them to be readily disengaged or uncoupled from the heads 25. It is obvious that any other suitable means for reciprocating the cam wedges, either in unison or independently may be employed.

In such multiple assembly of core units, the exhaust conduits and intake conduits of succeeding units are interconnected as at 33 to enable the circulation of the live steam from one unit to another, thereby equalizing both the temperatures and pressure.

While the preferred form of construction consists of overlapping the inturned margins of the side sections 1, upon the lateral margins of the intermediate tread 2, this arrangement may be reversed as shown in Fig. 9. In this construction the tread section 2' is of crescent shape and encloses the relatively movable side sections 1', which have an arcuate bearing upon the interior of the crescent shape tread. In this construction the separation or lateral adjustment of the side sections 1', from each other automatically exerts an outward pressure upon the tread section, due to the camming action of the inturned margins of the sides 1'. Thus the tread section may be adjusted radially or outwardly by the relative adjustment of the side sections independent of direct pressure. The distention of the core units may be effected by means of the longitudinally adjustable plungers or wedges 3 as before described, or such distention may be effected by means of an expansible air bag or inflation tube 35, interposed between the side sections 1'.

Such air bag 35 likewise might be substituted for the longitudinally movable plungers of the construction illustrated in the preceding figures.

Cross reference is made to my copending application Serial No. 663,202, filed Sept. 17, 1923.

Having thus described my invention, I claim:

1. In a core for tires, a plurality of separate longitudinally disposed chambered members having walls, of flexible but inextensible material, means for admitting fluid under pressure to the respective chambers, and a mechanically operated pressure bar member common to all the members for relatively moving such members independent of the fluid pressure.

2. In a tire core, a plurality of longitudinally disposed relatively movable expansible and contractible units, including a tread unit having a convex face and side units having concave faces overlapping the convex face of the tread unit, the exterior faces of the assembled units being shaped to jointly conform to the interior shape of a tire casing, and means to relatively adjust the members independent of their expansion and contraction.

3. A tire core comprising a plurality of longitudinally disposed independent expansible and contractible sections comprising side sections and a tread section interposed between the side sections, shaped and arranged to externally conform to the interior of a tire casing, and a pressure member contained within the assembly of sections being relatively movable under influence of pressure applied to the pressure member to vary the external dimensions of the assembly and means for effecting expansion and contraction of the sections independent of the adjustment of the pressure member.

4. An expansible tire core comprising a convex hollow tread section, and hollow ogee side sections overlapping the tread section, said sections being relatively movable in relation with each other, means for circulating heating medium through the sections, and a longitudinally adjustable pressure member common to all the sections.

5. In an expansible tire core, a plurality of relatively movable longitudinally disposed sections including a hollow tread section, and hollow side sections arranged on opposite sides of the tread section, means for circulating heating medium therethrough interengaging cam faces upon the side and tread sections, and a longitudinally adjustable pressure member for moving said tread section outwardly in a substantially radial direction, such movement being transmitted through said cam faces to exert lateral separating pressure upon the side sections.

6. In an expansible tire core, a plurality of longitudinally disposed arcuate, relatively adjustable hollow flexible sections conjointly conforming to the interior of a tire casing, means for mechanically adjusting said sections in relation one with the other to enlarge the exterior contour of the assembly and means for supplying fluid under pressure to the interior of said hollow sections to locally distend the sections independent of the mechanical adjusting means.

7. In an expansible tire core, a plurality of longitudinally disposed relatively adjustable hollow sections of flexible but inextensible material, means for mechanically adjusting said sections in relation one with another to enlarge the exterior contour of the assembly and means to admit fluid under pressure within the interiors of said sections to stay the sections against collapse.

8. In an expansible tire core, a plurality of relatively movable flexible sections, conjointly conforming to the interior of a tire core, means for relatively adjusting the sections to enlarge the assembly, the flexibility of the sections being adapted to equalize the pressure upon the surrounding tire due to such enlargement.

9. In an expansible tire core, relatively adjustable side and tread sections, exteriorly contoured to correspond with the interior of a tire casing, means for uniformly adjusting said sections into bearing engagement with a tire casing, and means for effecting further ununiform adjustment of the sections to equalize the pressure upon the tire casing.

10. In an expansible tire core, relatively adjustable side and tread sections, exteriorly contoured to correspond with the interior of a tire casing, means for mechanically adjusting the sections in relation one with another to exert pressure upon a surrounding tire casing, and fluid pressure means supplemental to the mechanical pressure, means for equalizing the pressure upon the area operated upon.

11. In an expansible tire core, a plurality of relatively adjustable sections contoured to correspond with the interior of a tire casing, and both mechanical and fluid pressure means coacting to afford expanding pressure, substantially as specified.

12. In an expansible tire core, a plurality of relatively adjustable hollow core sections of flexible but inextensible material exteriorly contoured to correspond with the interior of a tire casing, means for relatively adjusting the sections to exert expanding pressure upon an enclosing casing, and means for admitting fluid pressure to the interior of the sections to expand the sections independent of their relative adjustment.

13. In an expansible tire core, a plurality of expansible relatively adjustable core sections, exteriorly contoured to correspond with the interior of a tire casing, means for expanding the assembly of sections by relative adjustment of the individual sections, and means for expanding the individual sections independent of their relative adjustment.

14. In an expansible tire core, a pair of flexible hollow side sections of substantially ogee form, a convex tread section arranged in overlapping relation with the side sections, means for relatively adjusting the sections to exert expanding pressure upon an enclosing tire casing, and means for admitting fluid under pressure to the interiors of the side sections to expand said side sections independent of their relative adjustment.

15. In an expansible tire core, a pair of relatively adjustable side sections of substantially ogee form, a hollow flexible tread section arranged in overlapping relation with the side sections, means for relatively adjusting the sections to exert expanding pressure upon an enclosing tire casing and means for admitting fluid under pressure to said hollow tread section to expand said section independent of the relative adjustment of the side sections.

16. In an expansible tire core, a pair of hollow flexible side sections and a hollow flexible tread section arranged in overlapping relation with the side sections, mechanical means for relatively adjusting said side and tread sections and means for admitting fluid under pressure to distort the flexible sections independent of their relative adjustment.

17. In an expansible tire core, relatively adjustable tread and side core sections, a plurality of longitudinally movable tapered plungers enclosed within the assembly of core sections and exerting wedging influence upon each of the tread and side members to expand the assembly of core sections, and screw pressure means for simultaneously adjusting the plurality of plungers.

18. In an expansible tire core, a core unit including a plurality of relatively adjustable core sections, a pair of oppositely disposed tapered plungers enclosed within the assembly of core sections and longitudinally adjustable to and from each other, to relatively move the core sections, said plungers having cam faces thereon and actuating bars movable radially in relation with the core unit and engaging the cam faces of the plungers to actuate said plungers to enlarge or diminish the core section assembly.

19. In an expansible tire core, a pair of longitudinally disposed substantially ogee side sections and a transversely convex tread section arranged in overlapping relation, the overlapping portions being reduced to feather edges whereby the faces of said sections merge easily one into the other, and relatively adjustable oppositely disposed tapered plungers engaging with opposite ends of the sections and simultaneously movable toward each other for expanding the core section assembly by relative movement of the sections to enlarge the core unit.

20. The herein described method of expanding a tire core consisting in subjecting said tire core to mechanical pressure to set the core against the tire casing and augmenting such mechanical pressure by internal fluid pressure to equalize the pressure by further expanding the core over any remaining relaxed areas.

21. The herein described method of enlarging expansible tire core units consisting in subjecting the tire core to internal mechanical pressure and simultaneously equalizing the mechanical pressure by fluid pressures.

22. The herein described method of treating tire casings consisting in subjecting the tire casing to simultaneous mechanical pressure against the tread of the tire casing in a radial direction and lateral mechanical pressure against the sides and bead portions of the casing and supplementing mechanical pressure by fluid pressure by which uniformity of pressure is insured, substantially as specified.

23. In an expansible tire core, a plurality of longitudinally disposed relatively movable arcuate sections, including a hollow tread section of convex cross sectional form and hollow side sections of ogee cross sectional form the margins of which overlap the margins of the tread section, and a mechanically operated pressure bar common to the said sections exerting pressure in a radial direction upon the tread section and laterally upon the side sections to relatively move said sections, and means to admit a fluid body to each of the movable arcuate sections.

24. In an expansible tire core, a hollow flexible tread section, and two hollow flexible side sections, said sections being contoured to agree with the interior of a tire casing, and both mechanical and fluid pressure means jointly operating to extend the tire core composed of said sections to exert expanding pressure upon an enclosing tire body.

In testimony whereof, I have hereunto set my hand this 18th day of January, A. D. 1923.

ANDREW HUETTER.